US012326243B2

(12) United States Patent
Wang et al.

(10) Patent No.: US 12,326,243 B2
(45) Date of Patent: Jun. 10, 2025

(54) LED LAMP WITH ROTATING MEMBER

(71) Applicant: JIAXING SUPER LIGHTING ELECTRIC APPLIANCE CO.,LTD, Zhejiang (CN)

(72) Inventors: Mingbin Wang, Zhejiang (CN); Heng Zhao, Zhejiang (CN); Jian Lu, Zhejiang (CN); Senhao Lu, Zhejiang (CN); Guosheng Tan, Zhejiang (CN)

(73) Assignee: JIAXING SUPER LIGHTING ELECTRIC APPLIANCE CO., LTD, Zhejiang (CN)

( * ) Notice: Subject to any disclaimer, the term of this patent is extended or adjusted under 35 U.S.C. 154(b) by 0 days.

(21) Appl. No.: 18/839,438

(22) PCT Filed: Jul. 14, 2023

(86) PCT No.: PCT/CN2023/107385
§ 371 (c)(1),
(2) Date: Aug. 18, 2024

(87) PCT Pub. No.: WO2024/027483
PCT Pub. Date: Feb. 8, 2024

(65) Prior Publication Data

US 2025/0155108 A1 May 15, 2025

(30) Foreign Application Priority Data

Aug. 5, 2022 (CN) ............................ 202210936863
Oct. 18, 2022 (CN) ............................ 202211271865
(Continued)

(51) Int. Cl.
*F21V 19/02* (2006.01)
*F21K 9/238* (2016.01)
(Continued)

(52) U.S. Cl.
CPC .............. *F21V 19/02* (2013.01); *F21K 9/238* (2016.08); *F21V 29/70* (2015.01); *F21Y 2113/13* (2016.08)

(58) Field of Classification Search
CPC .......... F21V 19/02; F21V 29/70; F21K 9/238; F21Y 2113/13
See application file for complete search history.

(56) References Cited

U.S. PATENT DOCUMENTS

2013/0148338 A1 6/2013 Chen et al.

FOREIGN PATENT DOCUMENTS

CN 207162340 U 3/2018
CN 108679518 A 10/2018
(Continued)

*Primary Examiner* — Karabi Guharay
(74) *Attorney, Agent, or Firm* — CKC & Partners Co., LLC

(57) ABSTRACT

A LED lamp includes a case, a power source arranged inside the case, a heat sink connected to one end of the case, a light source connected to the heat sink and the power source, a lamp head connected to the case, and a rotating structure arranged between the case and the heat sink. The rotating structure includes a first and a second rotating components which respectively include a first rotating surface and a second rotating surface opposite to the first rotating surface. The acute angle between the first rotating surface and a side wall of the case is a, and the acute angle between the second rotating surface and the side wall of the case is b. The included angle a and the included angel b are respectively larger than or equal to 15 degrees and less than or equal to 75 degrees.

20 Claims, 14 Drawing Sheets

(30) Foreign Application Priority Data

| | | | |
|---|---|---|---|
| Nov. 28, 2022 | (CN) | ............................ | 202211500104 |
| Dec. 15, 2022 | (CN) | ............................ | 202211614041 |
| Jun. 5, 2023 | (CN) | ............................ | 202310656214 |
| Jun. 16, 2023 | (CN) | ............................ | 202310723120 |

(51) Int. Cl.

| | |
|---|---|
| ***F21V 29/70*** | (2015.01) |
| ***F21Y 113/13*** | (2016.01) |

(56) References Cited

FOREIGN PATENT DOCUMENTS

| | | | |
|---|---|---|---|
| CN | 113339759 | A | 9/2021 |
| CN | 214890658 | U | 11/2021 |

LED LAMP WITH ROTATING MEMBER

CROSS-REFERENCE TO RELATED APPLICATION

This application is a National Stage Entry of International application No. PCT/CN2023/107385, filed Jul. 14, 2023 which claims the benefits of priority of CN application No. 202210936863.4 filed on Aug. 5, 2022, CN application No. 202211271865.2 filed on Oct. 18, 2022, CN application No. 202211500104.X filed on Nov. 28, 2022, CN application No. 202211614041.0 filed on Dec. 15, 2022, CN application No. 202310656214.3 filed on Jun. 5, 2023, CN application No. 202310723120.3 filed on Jun. 16, 2023, the content of which are incorporated herein by reference in their entireties.

BACKGROUND

Technical Field

The invention relates to lighting devices, particularly to a LED lamp.

Description of Related Art

LED lamps are widely used in various places because of their convenient installation and maintenance, power saving, high brightness and small size. As a new generation of solid-state energy, the core component of LED lamps is a light-emitting diode (LED), which has advantages of long life, high efficiency and energy saving.

LED lamps in the prior art generally include two usage scenarios of vertical lighting and horizontal lighting. The design of LED lamps will match the above two usage scenarios to produce LED lamps that emit light vertically and transversely. However, if the irradiation direction has to be changed, whole lamp should be replaced, which has the problems of waste of resources and increasing the consumption of users.

Moreover, the length of a LED lamp in the prior art generally adopts a fixed mode, that is, the length is not variable. It cannot meet the needs of customers when the length of LED lamps has to be changed.

In view of this, the inventors have devoted themselves to the above-mentioned prior art, researched intensively and cooperated with the application of science to try to solve the above-mentioned problems of waste of resources and second time consumption. Finally, the invention which is reasonable and effective to overcome the above drawbacks is provided.

SUMMARY

Many embodiments of the invention are briefly described herein. However, the phrases therein are only used to depict some embodiments disclosed in the specification (no matter whether they are claimed) instead of a full description of all possible embodiments. Some embodiments used to describe each feature or aspect of the disclosure may be combined in different manners to form the rotating member and the LED lamp with the rotating member.

The invention provides a new rotating structure, a LED lamp with the rotating structure and other aspects of features to solve the above problems.

The invention provides a LED lamp, which includes a first rotating member and a second rotating member, wherein the first rotating member is arranged facing to the second rotating member. The first rotating member includes a first rotating face. The second rotating member includes a second rotating face. The first rotating face is arranged facing to the second rotating face. There is an included angle a between the first rotating face and a sidewall of the case, and there is an acute included angle b between the second rotating face and a sidewall of the case, in which $15° \leq a \leq 75°$ and $15° \leq b \leq 75°$.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
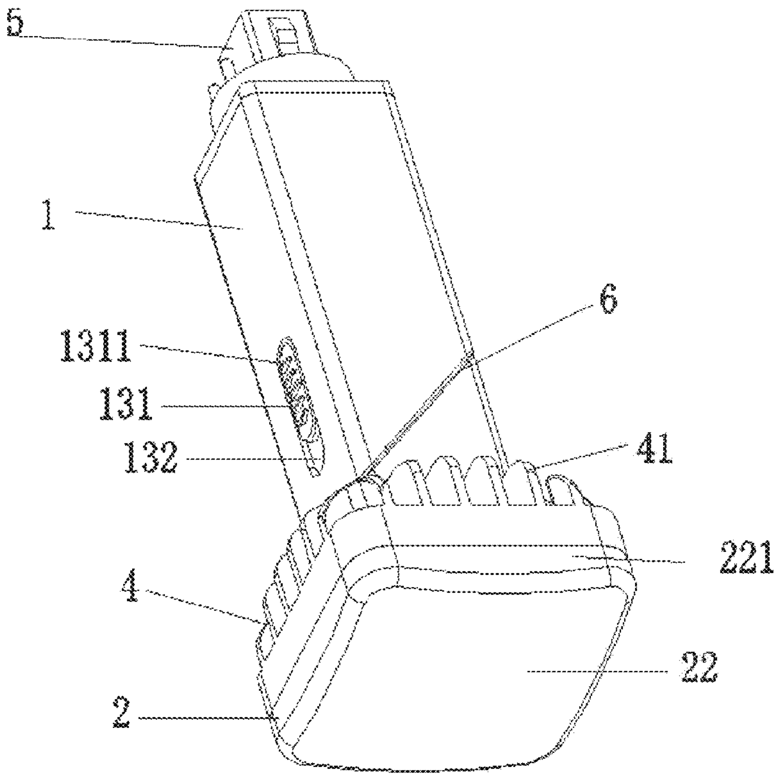
FIG. 1 is a structurally schematic view of an exemplary embodiment of the LED lamp of the invention.
Figure 2:
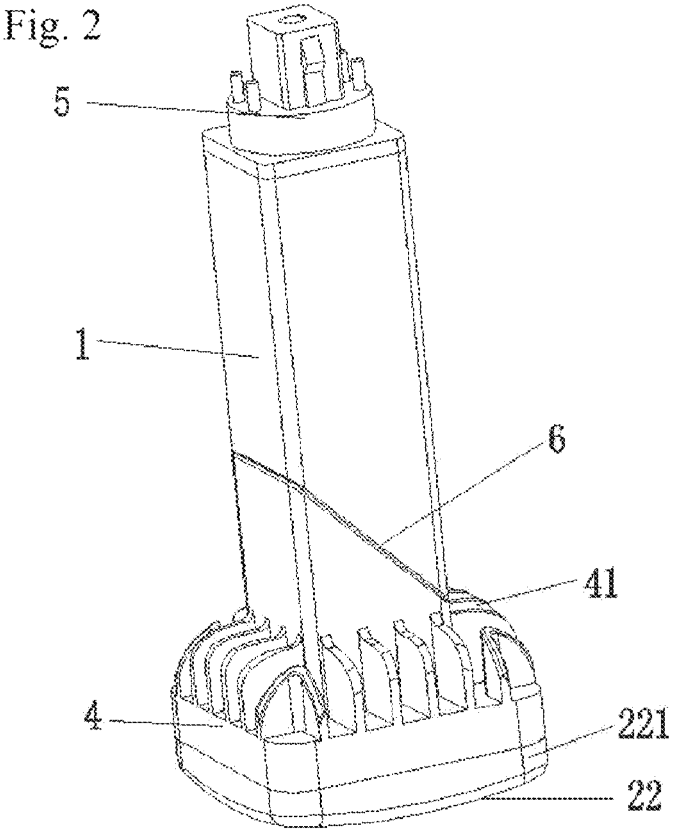
FIG. 2 is a structurally schematic view of an exemplary embodiment of the LED lamp of the invention.

In order to facilitate the understanding of the present invention, the present invention will be described more fully below with reference to the associated drawings. Preferred embodiments of the invention are shown in the accompanying drawings. However, the present invention can be implemented by many different forms and is not limited to the embodiments described below. On the contrary, the purpose of providing these embodiments is to make the contents of the present invention more thorough and comprehensive. The directions such as "axial direction", "above" and "below" in the following text are all for the purpose of more clearly indicating the structural positional relationship, and are not intended to limit the present invention. In the present disclosure, the definitions of "vertical", "horizontal" and "parallel" include the situation of ±10% based on the standard definition. For example, vertical usually means that the included angle with respect to the reference line is 90 degrees, but in the present disclosure, vertical refers to the situation between 80 degrees and 100 degrees.

As shown in FIGS. 1-8 and 14, an embodiment of the invention provides a LED (light-emitting diode) lamp, which includes a case 1, a light source 2, a power source 3, a heat sink 4, a lamp head 5 and a rotating structure 6. The heat sink 4 is connected with the case 1 and disposed at an end of the case 1. The power source 3 is disposed in the case 1. The light source 2 is disposed on the heat sink 4 and electrically connected to the power source 3. The lamp head 5 is connected with the case 1 and disposed at an end of the case 1, which is opposite to the light source 2. The rotating structure 6 is disposed at a junction between the case 1 and the heat sink 4.

Figure 5:
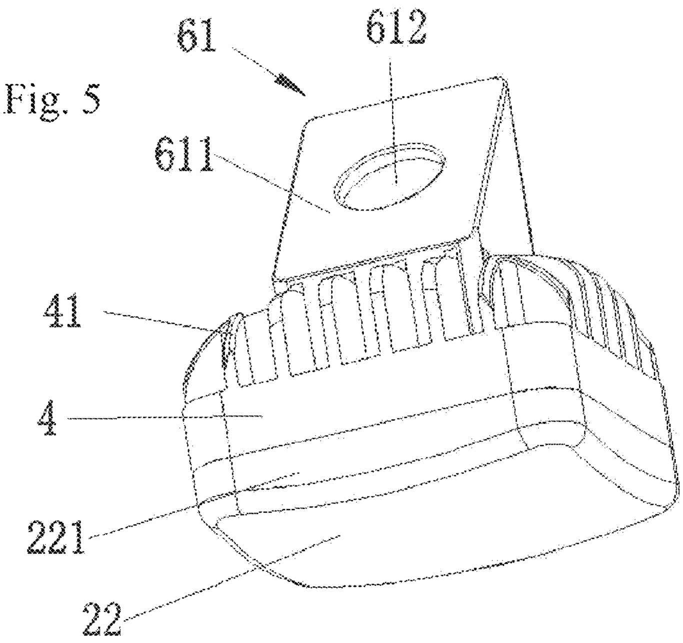
FIG. 5 is a structurally schematic view of the heat sink and the light source of an exemplary embodiment of the LED lamp of the invention.
Figure 6:
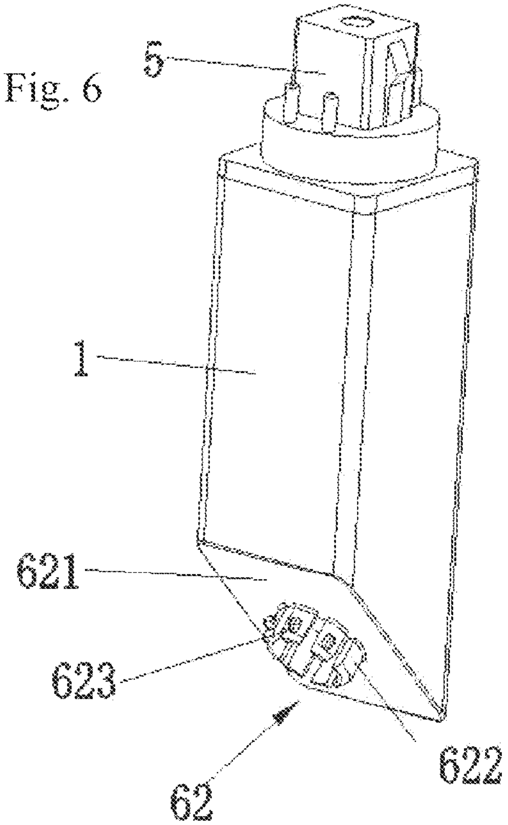
FIG. 6 is a structurally schematic view of the case and the lamp head of an exemplary embodiment of the LED lamp of the invention.
Figure 7:
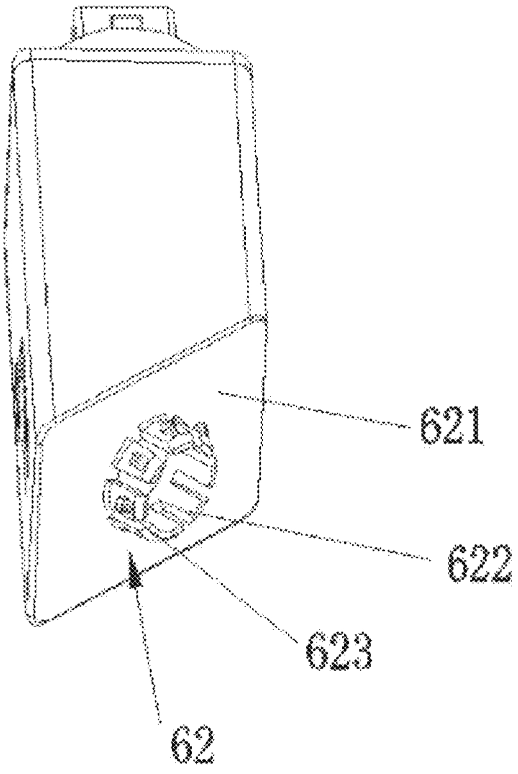
FIG. 7 is a structurally schematic view of the case and the lamp head of an exemplary embodiment of the LED lamp of the invention.

As shown in FIGS. 5-6, the rotating structure 6 may include a first rotating member 61 and a second rotating member 62. The first rotating member 61 is arranged facing to the second rotating member 62. The first rotating member 61 cooperates with the second rotating member 62 to make the case 1 of the LED lamp rotatable so as to drive both the heat sink 4 and the light source 2 rotate (the relationship between the both remains consistent) to control the light emitting direction of the LED lamp.

When changing the light emitting direction of the LED lamp, the only thing needed to do is to make the first rotating member 61 and the second rotating member 62 rotate relatively. Plugging and unplugging the first rotating member 61 and the second rotating member 62 are not needed so as to prevent any electric connection between various parts of the LEP lamp from being damaged when plugging or unplugging.

As shown in FIGS. 4-7, the first rotating member 61 may further include a first rotating face 611, and the second rotating member 62 may include a second rotating face 621. The first rotating face 611 is arranged facing to the second rotating face 621, and the first rotating face 611 is parallel or substantially parallel to the second rotating face 621. The first rotating face 611 may be the same or substantially the same as the second rotating face 621 in size. To make the LED lamp appear in better completeness, at least 50% of an area of each of the first rotating face 611 and the second rotating face 621 are in contact with each other. This can make no obvious gap exist between the first rotating face 611 and the second rotating face 621 to guarantee the product quality. In a height direction of the (whole) LED lamp, there is an acute included angle a between the first rotating face 611 and a sidewall of the case 1, and there is an included angle b between the second rotating face 621 and the sidewall of the case 1. The included angle a is the same or substantially the same as the included angle b. To change a light emitting direction of the LED lamp from a vertical direction to a transverse direction while preventing the change of the light emitting direction from being excessively large or small, the included angle a is provided as: 15°≤a≤75°. When the angle is less than 15°, the changing range of the light emitting direction is excessively large. When the angle is greater than 75°, the changing range of the light emitting direction is excessively small. Preferably, 30°≤a≤60°, and more preferably, the included angle a=45°. Since the included angle a is the same or substantially the same as the included angle b, i.e., the included angle b is provided as: 15°≤b≤75°. Preferably, the included angle b is provided: 30°≤b≤60°, and more preferably, the included angle b=45°. When the included angle a or b appears to be 45°, the light emitting direction of the LED lamp may have a 90-degree conversion and change.

As shown in FIGS. 5-6, the first rotating member 61 may include a first rotating portion 612 and the second rotating member 62 may include a second rotating portion 622. The first rotating portion 612 is connected with the second connecting portion 622 to make the rotating structure 6 rotatable. In detail, in an embodiment, the second rotating portion 622 may be inserted into the first rotating portion 612, i.e., at least a part of the second rotating portion 622 is located in the first rotating portion 612. The second rotating portion 622 may be rotated in the first rotating portion 612. The second rotating portion 622 may be an extended portion of the second rotating member 62 toward the first rotating portion 612. The first rotating portion 612 may be an opening. An outer surface of the second rotating portion 622 is in contact with a part or multiple parts of the first rotating portion 612 to achieve a matching connection so as to make both the first rotating member 61 and the second rotating member 62 rotate relatively. In another embodiment, the first rotating portion 612 may be inserted into the second rotating portion 622 and is relatively rotated therein. The first rotating portion 612 may be an extended portion of the first rotating member 62 toward the second rotating portion 622. The second rotating portion 622 may be an opening. An outer surface of the first rotating portion 612 is in contact with a part or multiple parts of the second rotating portion 622 to achieve a matching connection so as to make both the first rotating member 61 and the second rotating member 62 rotate relatively.

As shown in FIGS. 5, 6, 24 and 25, the first rotating member 61 may further include a first limiting member 613, and the second rotating member 62 may further include a second limiting member 623. The first limiting member 613 is in contact with the second limiting member 623 and they both cooperate mutually. When the LED lamp is rotated to a predetermined position, it can be limited and fixed. The first limiting member 613 may include a recess, and the second limiting member 623 may include a protrusion. At least a part of the second limiting member 623 is disposed in the first limiting member 613, and the second limiting member 623 may move in the first limiting member 613. In an embodiment, the first limiting member 613 may include a stopper 6131 and a first recess 6132, and the second limiting member 623 may be a protrusion toward the first rotating member 61. When the first rotating member 61 and the second rotating member 62 have been rotated to a predetermined position, the second limiting member 623 is embedded into the first recess 6132 of the first limiting member 613 to make the second limiting member 623 move in the first recess 6132. When the second limiting member 623 is rotated to the stopper 6131, it can limit the rotation of the second rotating member 62 relative to the first rotating member 61 by the blocking of the stopper 6131 to avoid over-rotation. Further, the stopper 6131 may include a step portion 61311 to make the second rotating member 62 not easy to slide out so as to fix the relative position of the first rotating member 61 and the second rotating member 62, which have been rotated, after the second rotating member 62 has entered the step portion 61311. In an embodiment, the first limiting member 613 may be a stopper, and the second limiting member 623 may be a bump toward the first rotating member 61. When the first rotating member 61 and the second rotating member 62 have been rotated to a predetermined position, the movement of the second limiting member 623 is limited by the blocking of the first limiting member 613 to limit the second rotating member 62 to rotate relative to the first rotating member 61 to avoid over-rotation. In another embodiment, the first limiting member 613 may be a trough, and the second limiting member 623 may be a bump toward the first rotating member 61. When the first rotating member 61 and the second rotating member 62 have been rotated to a predetermined position, the second limiting member 623 is embedded into the first limiting member 613 to limit the movement of the second limiting member 623 so as to limit the second rotating member 62 to rotate relative to the first rotating member 61 to avoid over-rotation.

As shown in FIGS. 3-6, the first rotating member 61 of the rotating structure 6 may be disposed on the heat sink 4, and the second rotating member 62 of the rotating structure 6 may be disposed on the case 1. The heat sink 4 is rotated relative to the case 1 by the action of the rotating structure 6. Since, the light source 2 is located on the heat sink 4, the light source 2 and the case 1 rotate relatively when the heat sink 4 and the case 1 rotate relatively, so as to change the direction of the light source 2 to further change the light emitting direction of the LED lamp.

Figure 4:
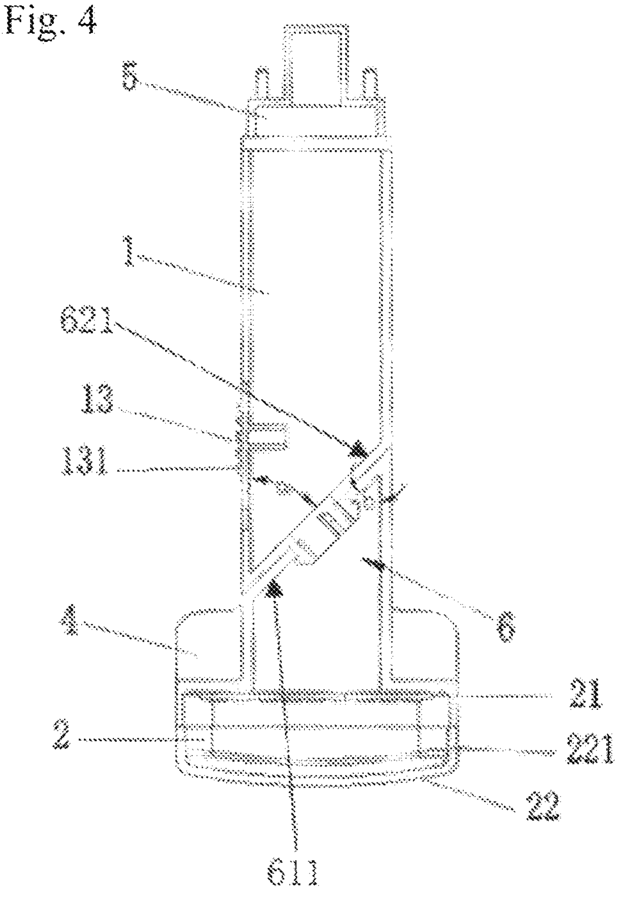
FIG. 4 is a cross-sectional schematic view of an exemplary embodiment of the LED lamp of the invention.
Figure 8:
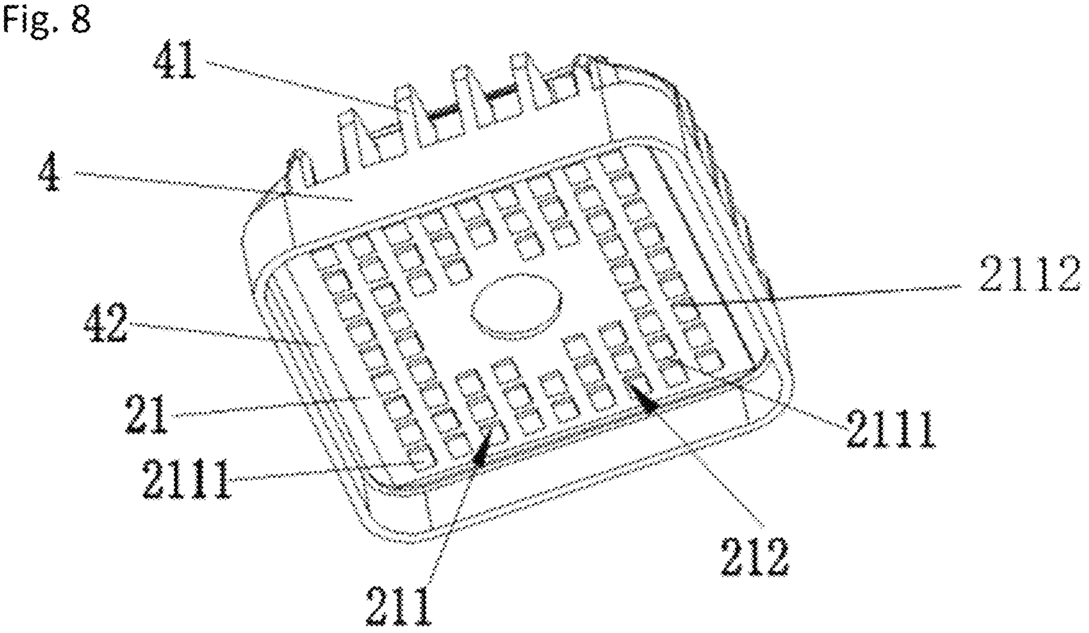
FIG. 8 is a structurally schematic view of the lamp board and the heat sink of an exemplary embodiment of the LED lamp of the invention.
Figure 9:
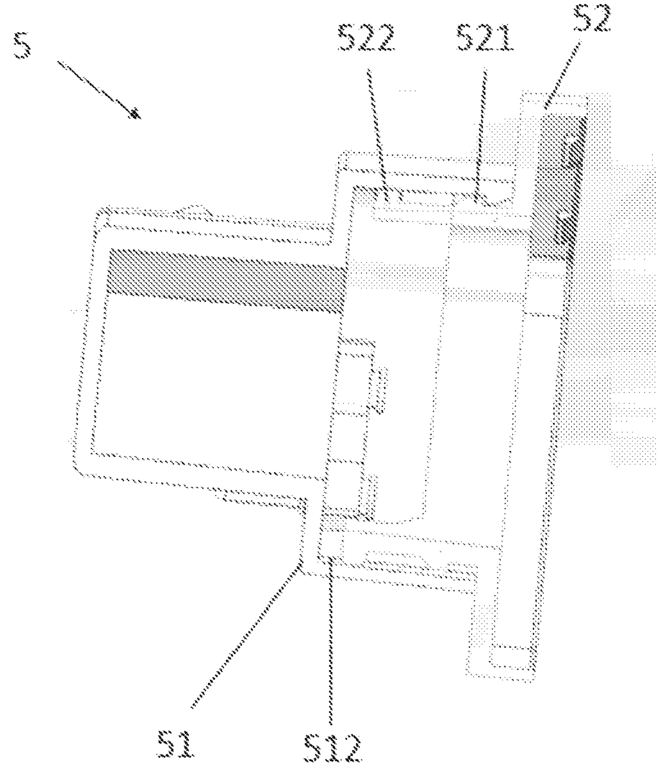
FIG. 9 is a structurally schematic view of the lamp head of an exemplary embodiment of the LED lamp of the invention.
Figure 10:
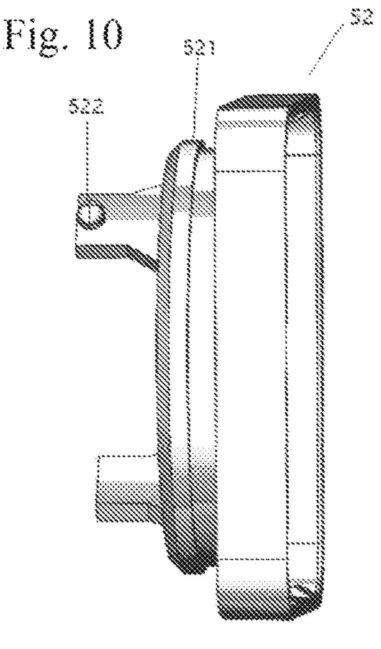
FIG. 10 is a structurally schematic view of the fixing portion of the case of an exemplary embodiment of the LED lamp of the invention.
Figure 11:
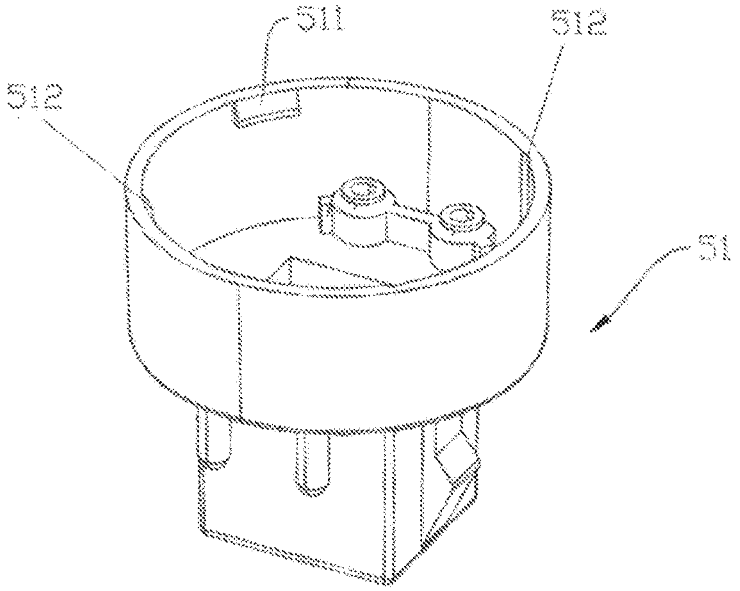
FIG. 11 is a structurally schematic view of the rotating portion of the lamp head of an exemplary embodiment of the LED lamp of the invention.
Figure 12:
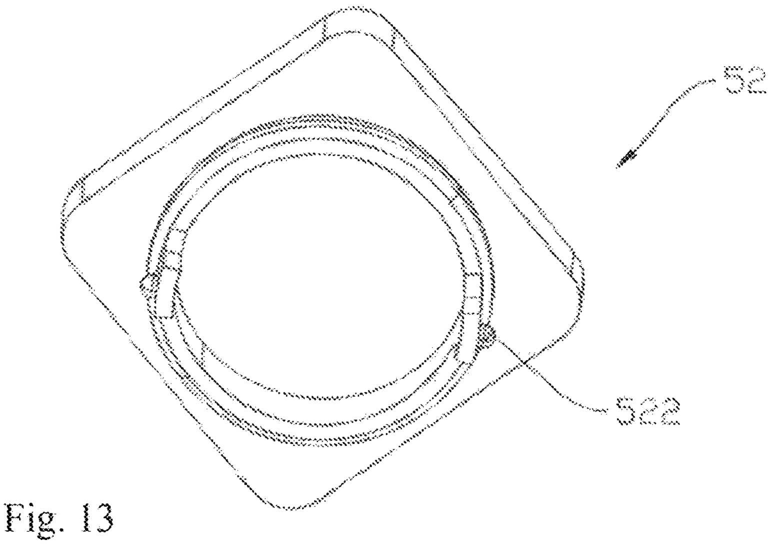
FIG. 12 is a structurally schematic view of the fixing portion of the case of an exemplary embodiment of the LED lamp of the invention.
Figure 13:
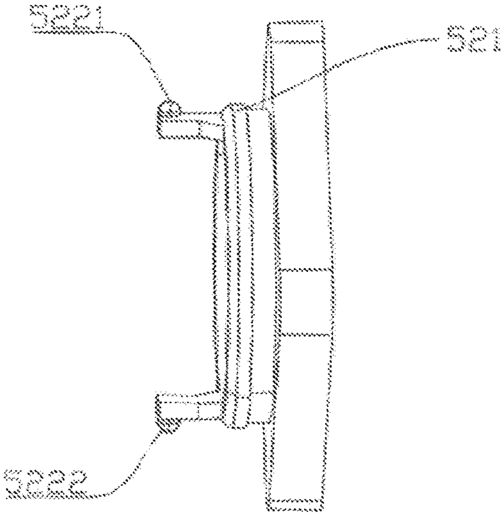
FIG. 13 is a structurally schematic view of the fixing portion of the case of an exemplary embodiment of the LED lamp of the invention.

As shown in FIGS. 4 and 8, the light source 2 includes a lamp board 21, which is in contact with the heat sink 4. The lamp board 21 may include a first lighting unit 211. Further, the first lighting unit 211 may include some lamp beads 2111. The LED lamp can make illumination by lighting up the lamp beads 2111. The lamp board 21 may further include a second lighting unit 212. The second lighting unit 212 includes some lamp beads 2112 which can emit light with different color temperature from the lamp beads 2111. In other words, the first lighting unit 211 and the second lighting unit 212 emit light with different color temperatures so as to make the LED lamp have a function of color temperature adjustment.

As shown in FIGS. 1-5 and 8, the light source 2 may further include a cover 22 covering the light emitting side of the lamp board 21. The cover 22 is connected and fixed to the heat sink 4. In detail, the cover 22 may be connected to the heat sink 4 by engagement, fastening or adhesion. The cover 22 may include a curved surface. After a light from the lamp board 21 passes the curved surface of the cover 22, it will be refracted to emit out so as to make the light emitting range of the LED lamp become larger by the action of the curved surface. Diffuser powder which can diffuse light may be added in the cover 22 to make the light emitted by the LED lamp softer. The cover 22 may include a side portion 221 which is light-permeable. By the light permeability of the side portion 221, the illuminating range of the light emitted by the light board 21 can be wider and softer.

The heat sink 4 may include a lamp board fixing portion 42 for fixing the lamp board 21. The lamp board 21 may be fixed on the lamp board fixing portion 42 of the heat sink 4 by glue, screw fastening or rivet welding.

The heat sink 4 may adopt metal material such as aluminum or an aluminum alloy to improve the heat dissipating effect. The heat sink 4 may include some fins 41 for heat dissipating.

As shown in FIGS. 9-13, the lamp head 5 of the LED lamp may include a case fixing portion 52 for connecting and fixing the case 1. The corresponding connecting portions of the case fixing portion 52 and the case 1 may be connected and fixed by engagement, fastening, screws, glue or the abovementioned manners.

The lamp head 5 may further include a lamp head rotating portion 51. The lamp head 5 and the case 1 may be rotated relatively by the action of the lamp head rotating portion 51 so as to adjust the light emitting direction of the Led lamp.

In detail, the lamp head rotating portion 51 may be matched and connected with the case fixing portion 52 to make the case 1 and the lamp head 5 rotate relatively. The lamp head rotating portion 51 may be connected and fixed to the case fixing portion 52 by engagement or fastening. The lamp head rotating portion 51 includes a first rotating unit 511. The case fixing portion 52 includes a second rotating unit 521. The first rotating unit 511 cooperates with the second rotating unit 521 to make the lamp head 5 and the case 1 rotate relatively. In the embodiment, the first rotating unit 511 may be an inverted hook, and the second rotating unit 521 may be a bump of the case fixing portion 52, which protrudes toward the first rotating unit 511. The first rotating unit 511 abuts against the second rotating unit 521. When rotating, the second rotating unit 521 is matched and connected by the first rotating unit 511 to make the second rotating unit 521 rotate on a side of the first rotating unit 511, which is far away from the case 1. In other embodiments, the second rotating unit 521 may be an inverted hook, and the first rotating unit 511 may be a bump of the case rotating portion 51 protruding toward the second rotating unit 521.

The first rotating unit 511 abuts against the second rotating unit 521. When rotating, the second rotating unit 521 is matched and connected by the first rotating unit 511 to make the second rotating unit 521 rotate on a side of the first rotating unit 511, which is far away from the case 1 (that is, regardless of the actual structures of the first rotating unit 511 and the second rotating unit 521, the action of the matching and connection between the both is that the second rotating unit 521 rotates on a side of the first rotating unit 511, which is far away from the case 1, so as to make the case fixing portion 52 be always inside the lamp head rotating portion 51 without separating to the outside of the lamp head rotating portion 51 while the lamp head rotating portion 51 is rotating.). The first rotating unit 511 and the second rotating unit 521 may adopt other matching manners to make the case 1 and the lamp head 5 implement a stable rotation without making the lamp head 5 fall off.

The case fixing portion 52 may include a lamp head rotating limiting portion 522. By the limitation of the lamp head rotating limiting portion 522 of the lamp head 5, when the lamp head 5 rotates relative to the case 1, it will form an action of limiting to prevent the lamp head 5 from over-rotating. In detail, the lamp head rotating limiting portion 522 may be located on the second rotating unit 521 so as to make the lamp head rotating limiting portion 522 be integrated with the second rotating unit 521 for structural simplification. The lamp head rotating limiting portion 522 may also be located at positions other than the second rotating unit 521, that is, the lamp head rotating limiting portion 522 is not integrated with the second rotating unit 521 so as to avoid installing or rotating difficulty due to excessively large interference or falling off from the lamp head due to excessively small interference. The lamp head rotating portion 51 may include a limiting matching portion 512, which cooperates with the lamp head rotating limiting portion 522 to accomplish the limiting effect.

In more detail, the lamp head rotating limiting portion 522 may be a bump of the case fixing portion 52 protruding outwards, and the limiting matching portion 512 may be a stopper disposed inside the lamp head rotating portion 51. When rotating, the lamp head rotating portion 51 rotates relative to the case fixing portion 52 and the limiting matching portion 512 rotates relative to the lamp head rotating limiting portion 522 so as to make the limiting matching portion 512 stop rotating when it touches the lamp head rotating limiting portion 522 to achieve the limiting effect. In the embodiment, the case fixing portion 52 is disposed with a first lamp head rotating limiting portion 5221 and a second lamp head rotating limiting portion 5222, which are arranged opposite to each other (preferably, the angle difference therebetween is 180°), the lamp head rotating portion 51 is disposed with two limiting matching portions 512, which are arranged opposite to each other (preferably, the angle difference therebetween is 180°), so as to make the two limiting matching portions 512 separately abut against the first lamp head rotating limiting portion 5221 and the second lamp head rotating limiting portion 5222 to be finally limited without over-rotation when rotating to a limited position in one direction. In another embodiment, the lamp head rotating limiting portion 522 and the limiting matching portion 512 may also adopt other matching manners to make the case 1 and the lamp head 5 implement relatively stable rotation without over-rotation. In the embodiment, the two limiting matching portions 512 are strip-shaped troughs disposed on the lamp head rotating portion 51.

Figure 14:
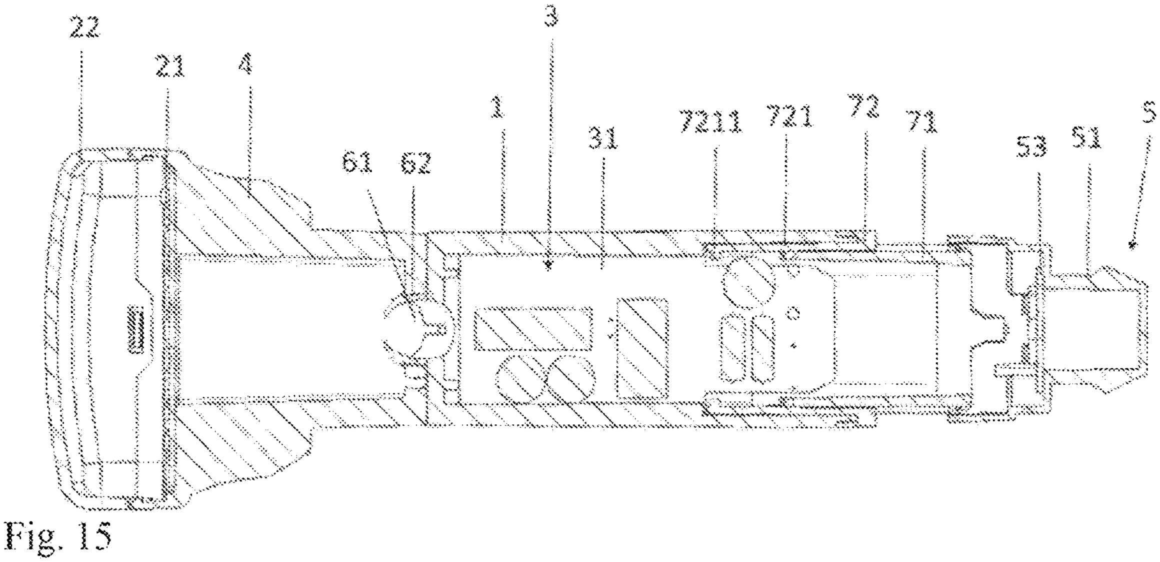
FIG. 14 is a cross-sectional schematic view of an exemplary embodiment of the LED lamp of the invention.
Figure 15:
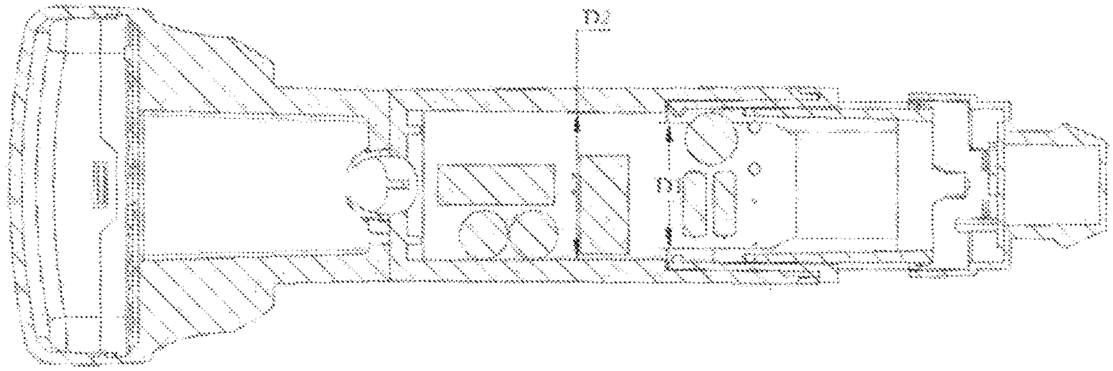
FIG. 15 is a cross-sectional schematic view of an exemplary embodiment of the LED lamp of the invention.

As shown in FIG. 14, the lamp head 5 may further include a second power board 53 disposed at the lamp head rotating portion 51. In detail, the second power board 53 may be fixed on the lamp head rotating portion 51 by glue, screw fastening or rivet welding. The second power board 53 is electrically connected to the power source 3. The second power board 53 may be parallel or substantially parallel with the lamp board 21.

Figure 27:
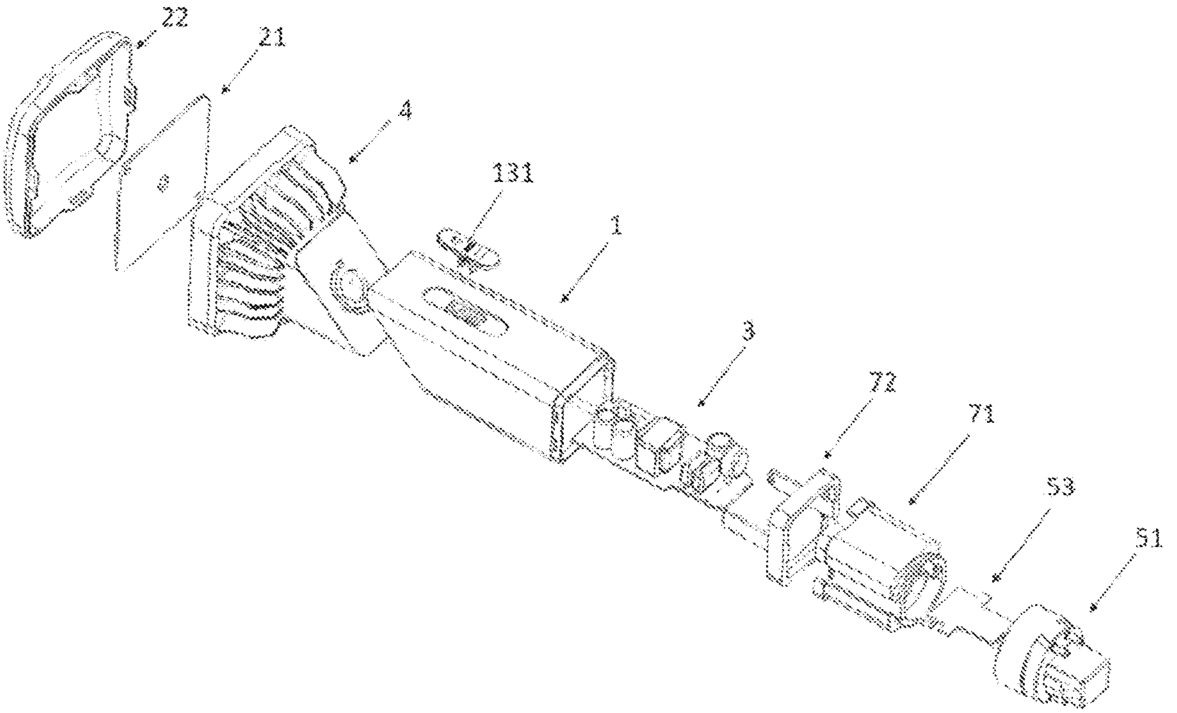
FIG. 27 is an exploded schematic view of an exemplary embodiment of the LED lamp of the invention.
Figure 28:
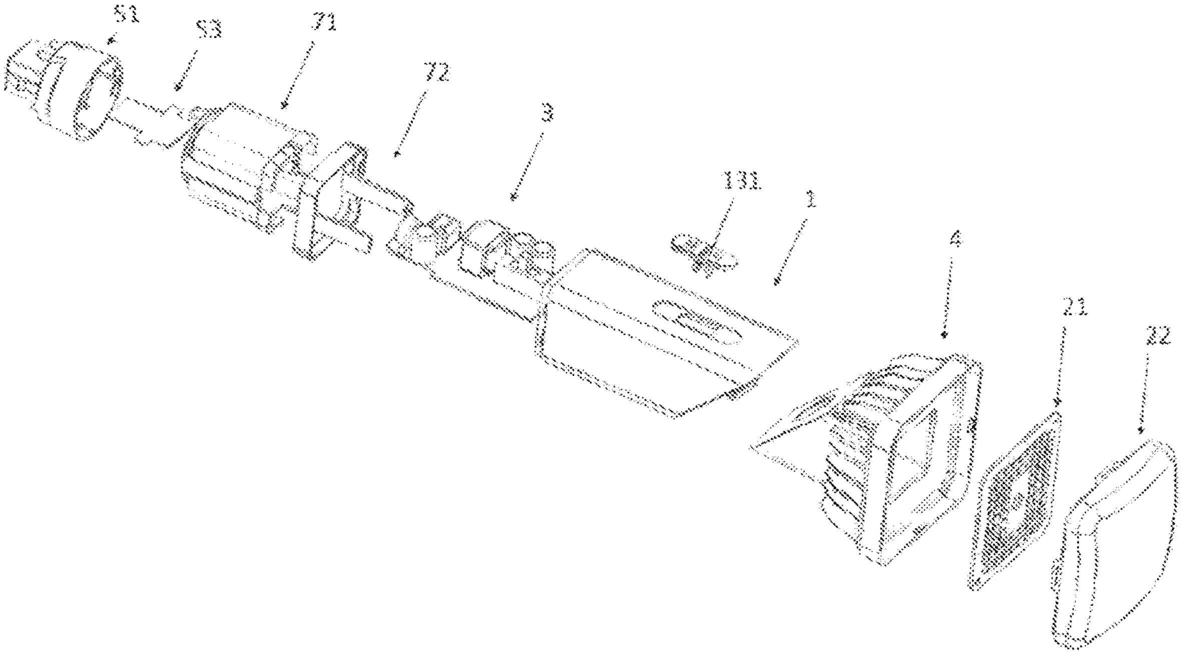
FIG. 28 is an exploded schematic view of an exemplary embodiment of the LED lamp of the invention.
Figure 29:
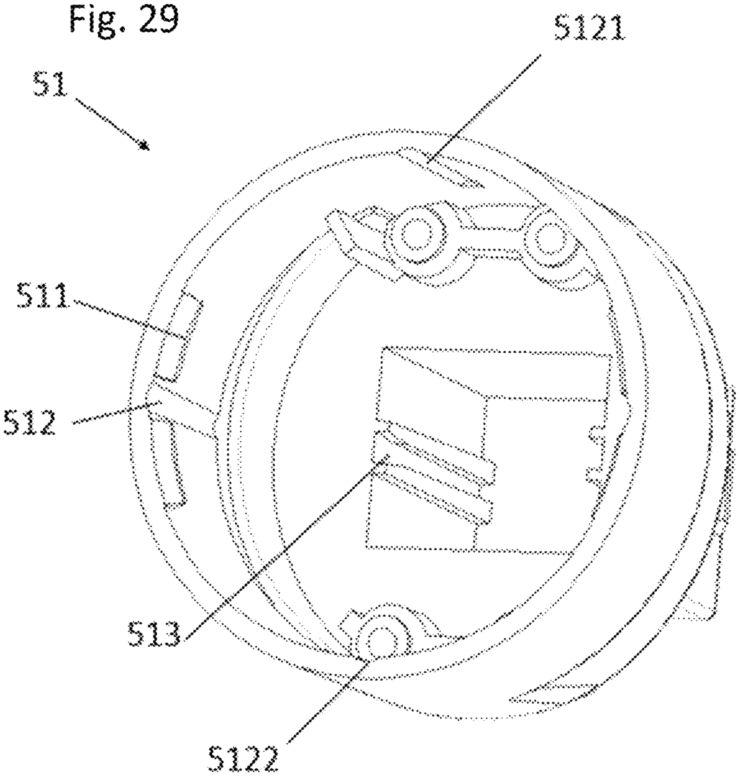
FIG. 29 is a structurally schematic view of the rotating portion of the lamp head of an exemplary embodiment of the LED lamp of the invention.
Figure 30:
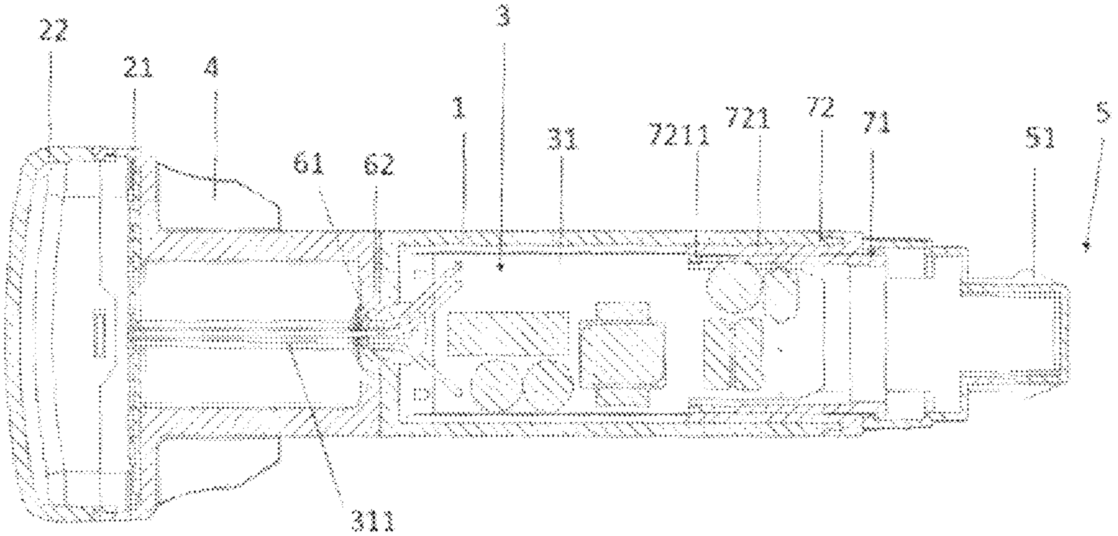
FIG. 30 is a cross-sectional schematic view of an exemplary embodiment of the LED lamp of the invention.

As shown in FIGS. 27-29, the second power board 53 may be arranged to be vertical to an installing surface of the lamp board 21 so as to be able to be installed by insertion to improve installing convenience. In detail, the lamp head rotating portion 51 may include a fixing trough 513 into which the second power board 53 may be inserted.

As shown in FIGS. 14-16, 22 and 30, the case 1 may include a chamber in which the power source 3 may be received. The power source 3 may include a power board 31. The power board 31 is electrically connected to the lamp board 21 of the light source 2. In some embodiments (refer to FIG. 30), the power board 31 may be electrically connected to the lamp board 21 of the light source 2 by a wire 311. The wire 311 may pass sequentially the first rotating member 61 and the second rotating member 62 in order to reach the lamp board 21. A width D1 of an end of the power board 31, which is far away from the light source 2 may be less than a width D2 of an end of the power board 31, which is adjacent to the light source 2, so as to receive other components in the case 1. Moreover, in other embodiments, the power board 31 of the power source 3 can be electrically connected to the lamp board 21 of the light source 2 by other electric connections, for example, the first rotating member 61 may be disposed with a conductive metal sheet (not shown), the lamp board 21 is connected to the power board 31 through the holes of the first rotating portion 612 and the second rotating portion 622 to form electric connection therebetween.

As shown in FIGS. 14-16 and 22, the case 1 may include a power board fixing portion 12 by which the power source 3 is fixed on the case 1. The power board 12 may be an engaging trough structure. The power board 3 is inserted into an engaging trough of the power board fixing portion 12.

Figure 3:
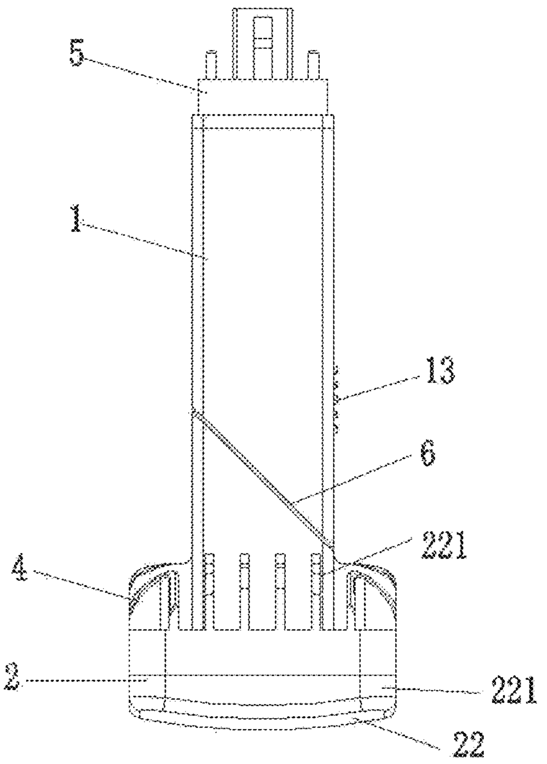
FIG. 3 is a structurally schematic view of an exemplary embodiment of the LED lamp of the invention.

As shown in FIGS. 1, 3 and 4, the case 1 may include a light adjustment assembly 13. The color temperature of the light from the light source 2 can be adjusted by the light adjustment assembly 13. The light adjustment assembly 13 may include an operating portion 131 by which the color temperature of the light from the light source 2 can be adjusted. The light adjustment assembly 13 may further include a trough portion 132 in which the operating portion 131 may be disposed. The operating portion 131 may be moved in the trough portion 132 and the moving range of the operating portion 131 can be limited by the size of the trough portion 132. Since there is no excessive protrusion from the operating portion 131 relative to the whole LED lamp so as to improve the overall appearance of the case 1. To be more convenient to operate the operating portion 131, the operating portion 131 may include a control member 1311. The control member 1311 may be a protrusion or a recess to add friction for easy operation when operating.

Figure 26:
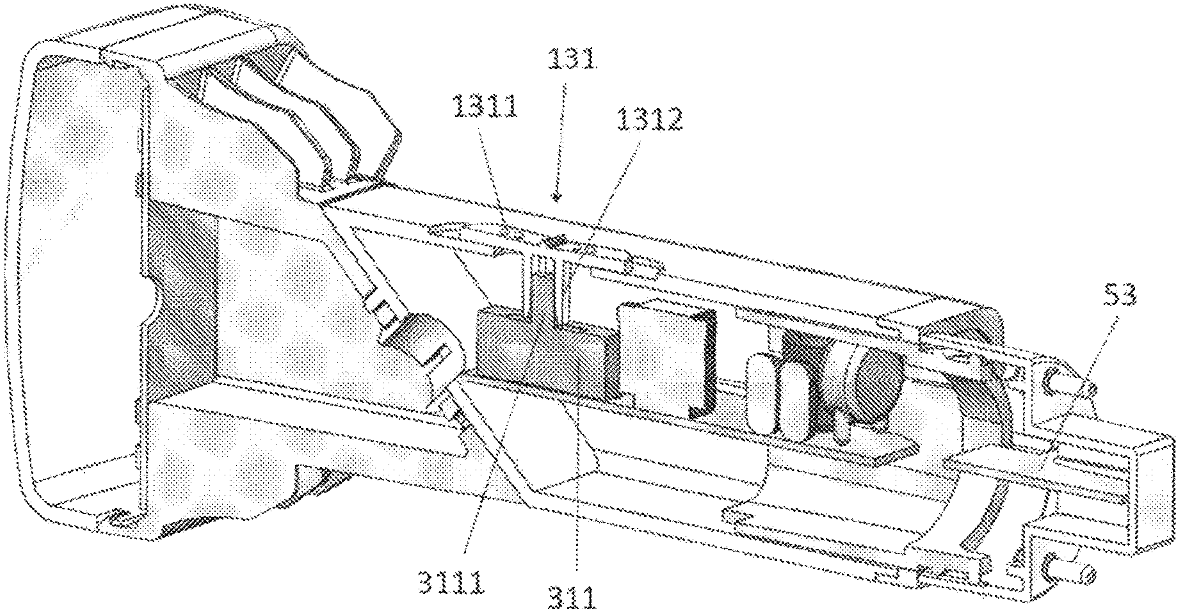
FIG. 26 is a cross-sectional schematic view of an exemplary embodiment of the LED lamp of the invention.

As shown in FIG. 26, the operating portion 131 may include an operating connecting portion 1312, and the power board 31 includes a controller 311. The operating connecting portion 1312 is connected to the controller 311 so that a user can adjust the controller 311 by toggling the operating portion 131 to implement the control on the circuit to adjust the color temperature of the light emitted by the LED lamp.

In detail, the controller 311 may include a switch portion 3111. The operating connection portion 1312 may be two clamping pins. The two clamping pins are separately disposed on two sides of the switch portion 3111 to fix the switch portion 3111 between the operating connecting portions 1312. The operating connecting portion 1312 may adopt a material having elastic deformability, such as plastic, so as to make the operating connecting portion 1312 and the switch portion 3111 not easy to misplace and fall off by interference.

Figure 16:
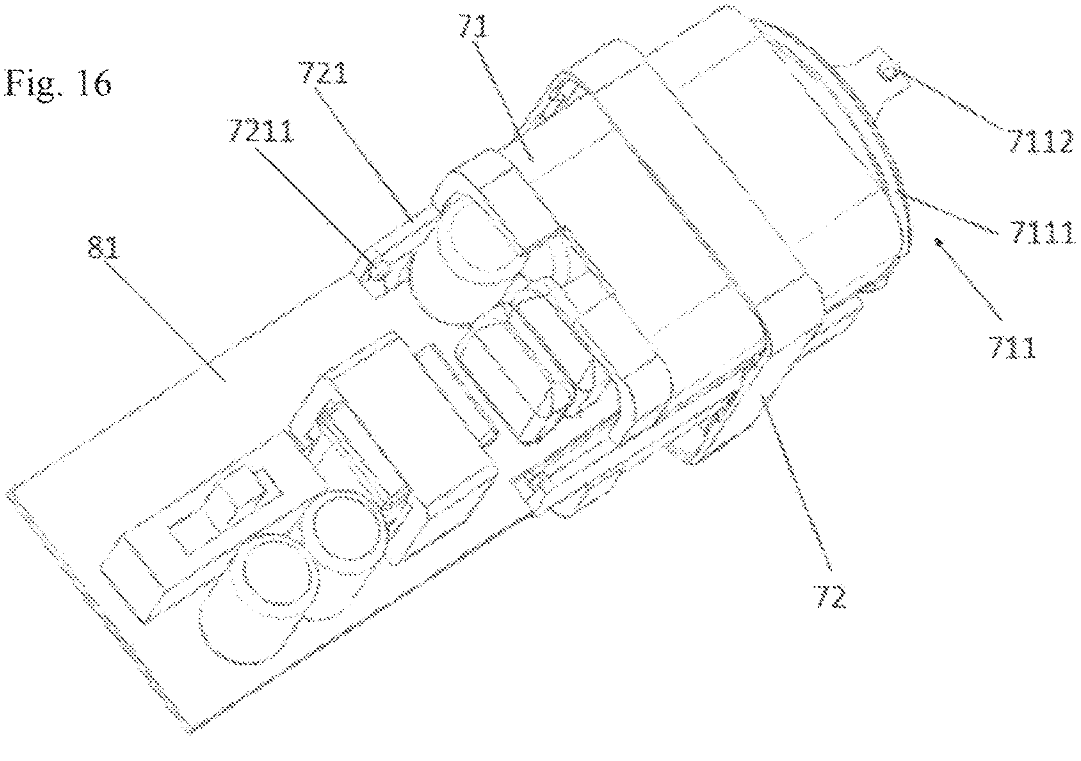
FIG. 16 is a structurally schematic view of the power source and the stretching member of an exemplary embodiment of the LED lamp of the invention.
Figure 17:
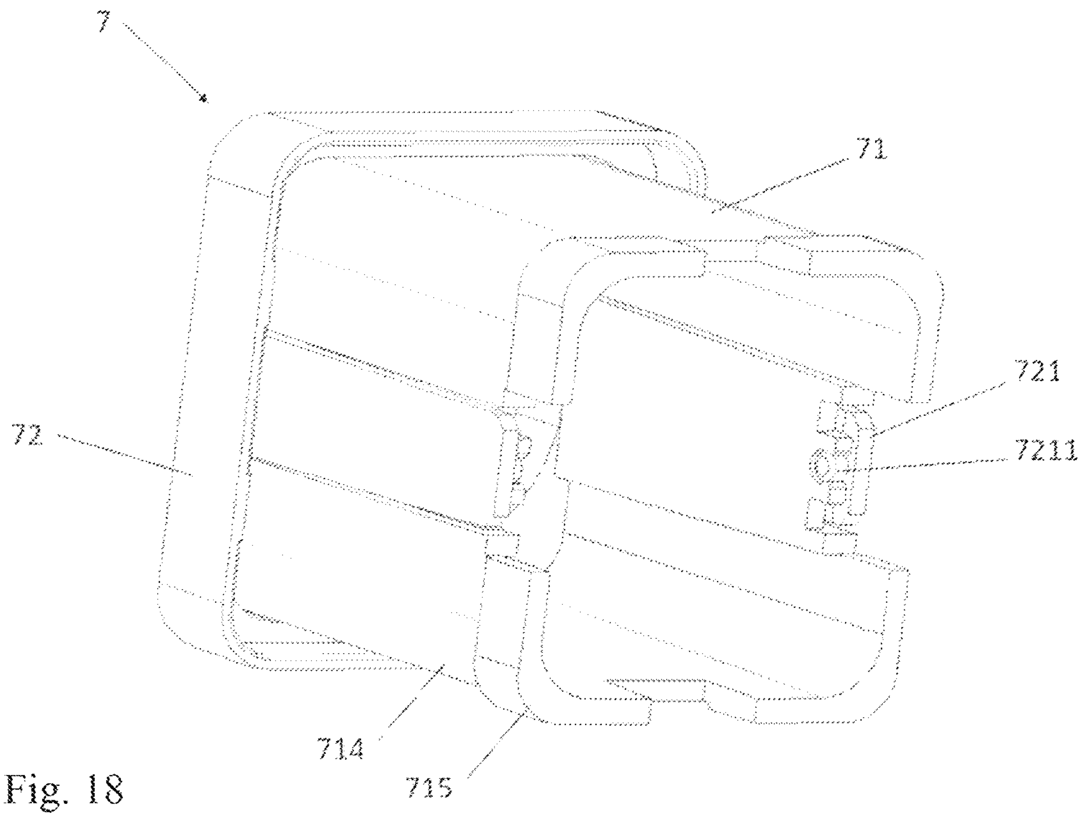
FIG. 17 is a structurally schematic view of the stretching member of an exemplary embodiment of the LED lamp of the invention.
Figure 18:
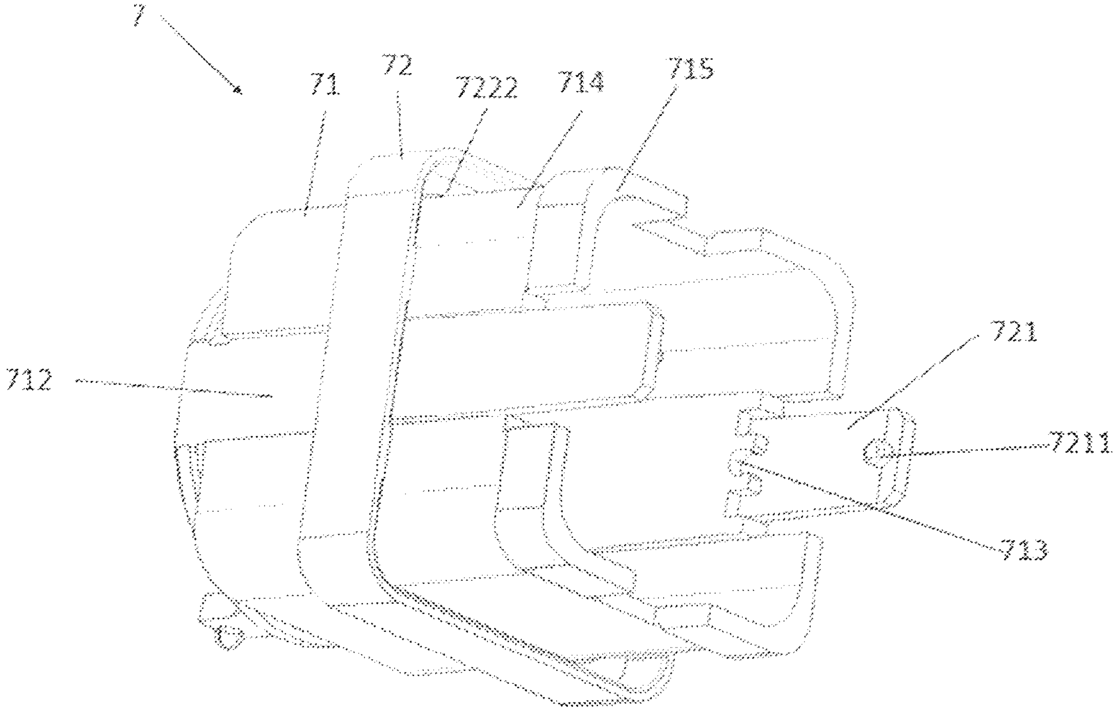
FIG. 18 is a structurally schematic view of the stretching member of an exemplary embodiment of the LED lamp of the invention.
Figure 19:
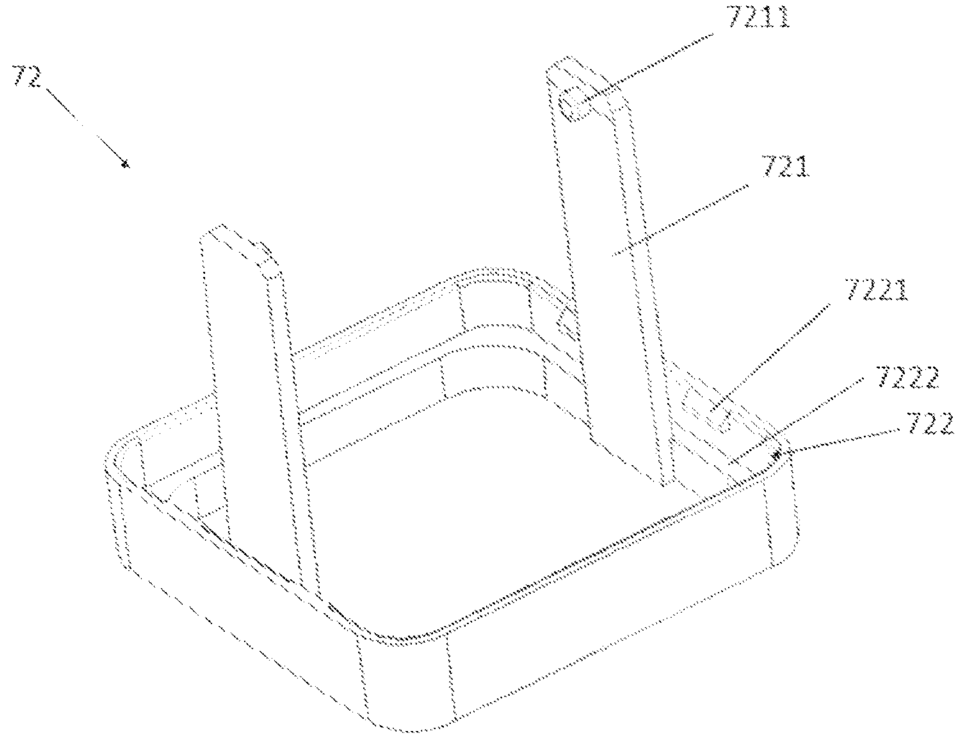
FIG. 19 is a structurally schematic view of the second stretching member of an exemplary embodiment of the LED lamp of the invention.
Figure 20:
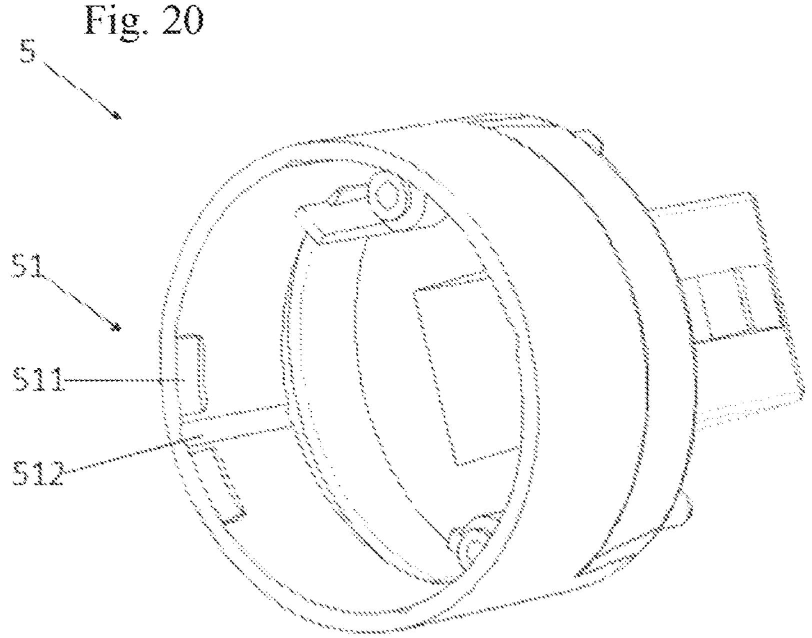
FIG. 20 is a structurally schematic view of the rotating portion of the lamp head of an exemplary embodiment of the LED lamp of the invention.
Figure 21:
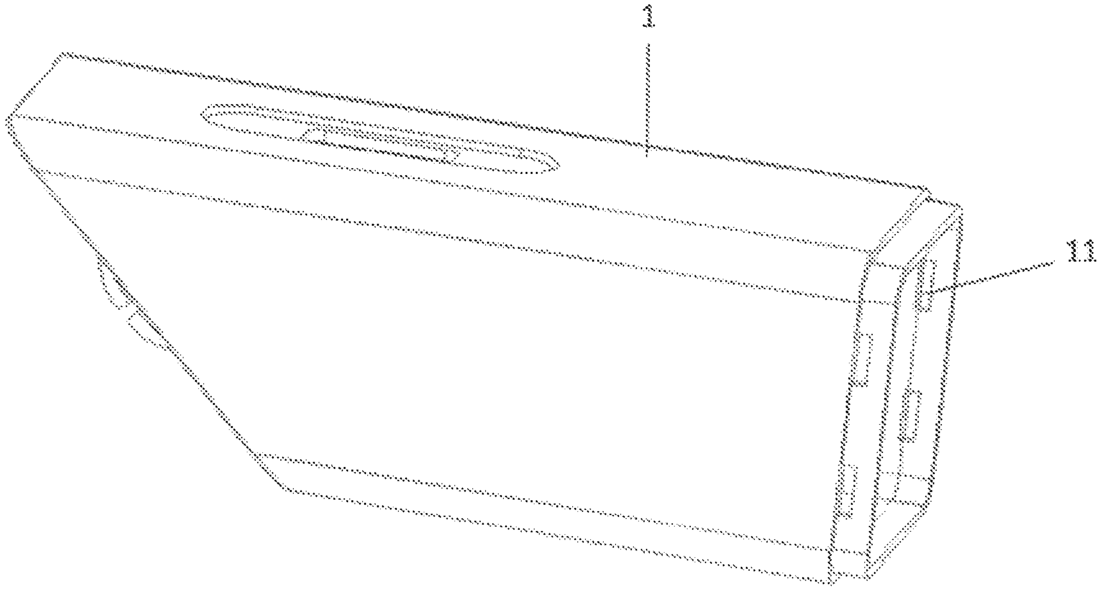
FIG. 21 is a structurally schematic view of the case of an exemplary embodiment of the LED lamp of the invention.
Figure 22:
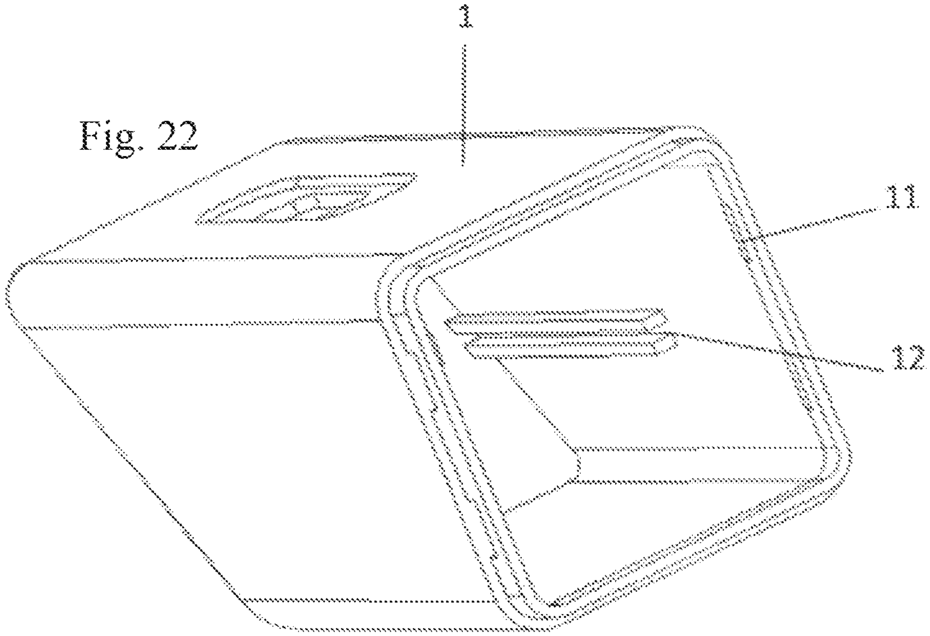
FIG. 22 is a structurally schematic view of the case of an exemplary embodiment of the LED lamp of the invention.
Figure 23:
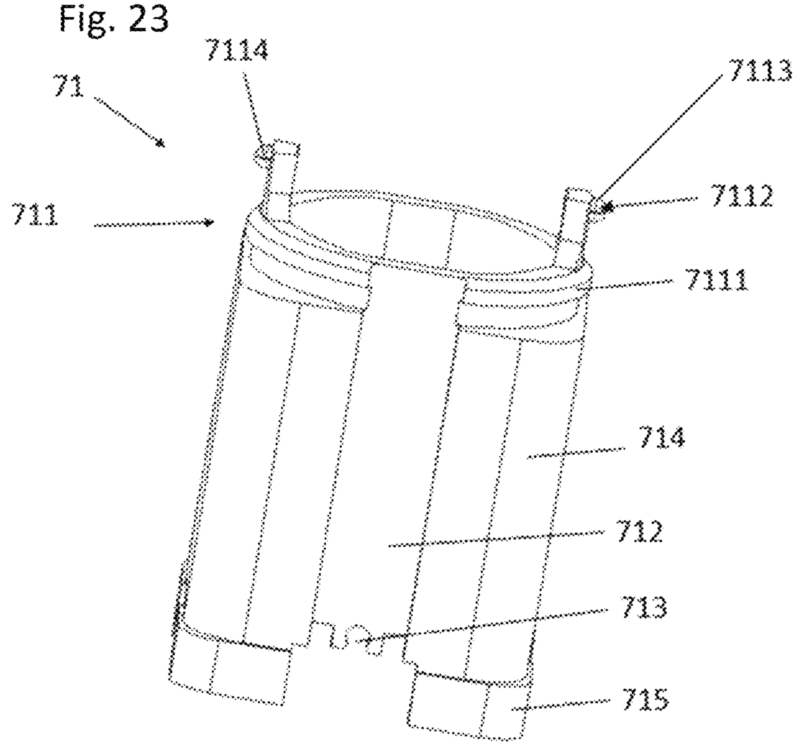
FIG. 23 is a structurally schematic view of the first stretching member of an exemplary embodiment of the LED lamp of the invention.
Figure 24:
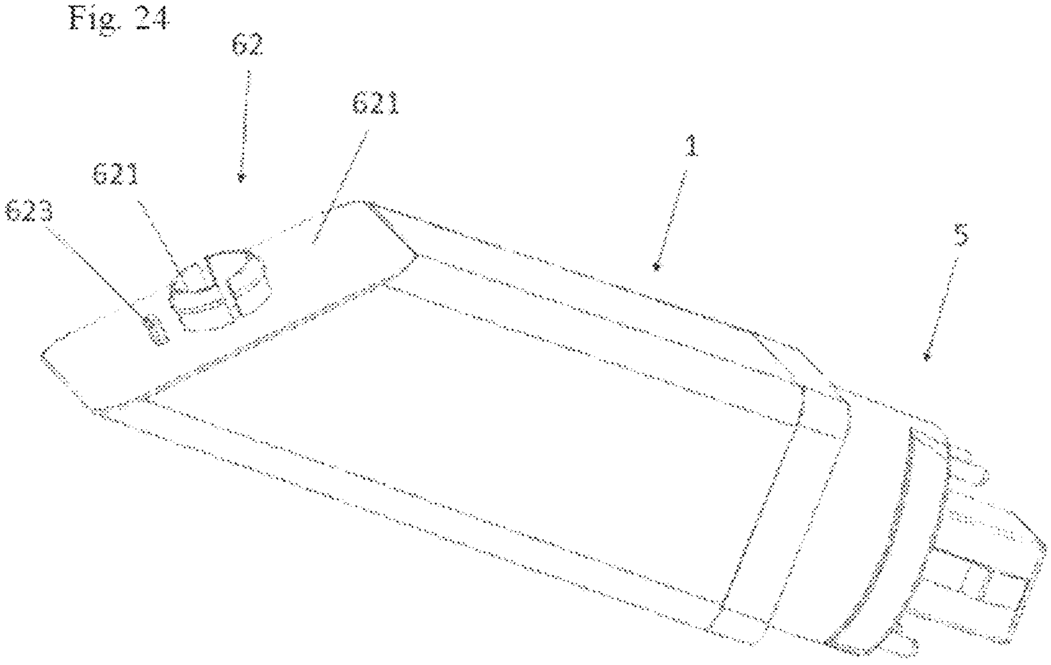
FIG. 24 is a structurally schematic view of the second rotating member, the case and the lamp head of an exemplary embodiment of the LED lamp of the invention.
Figure 25:
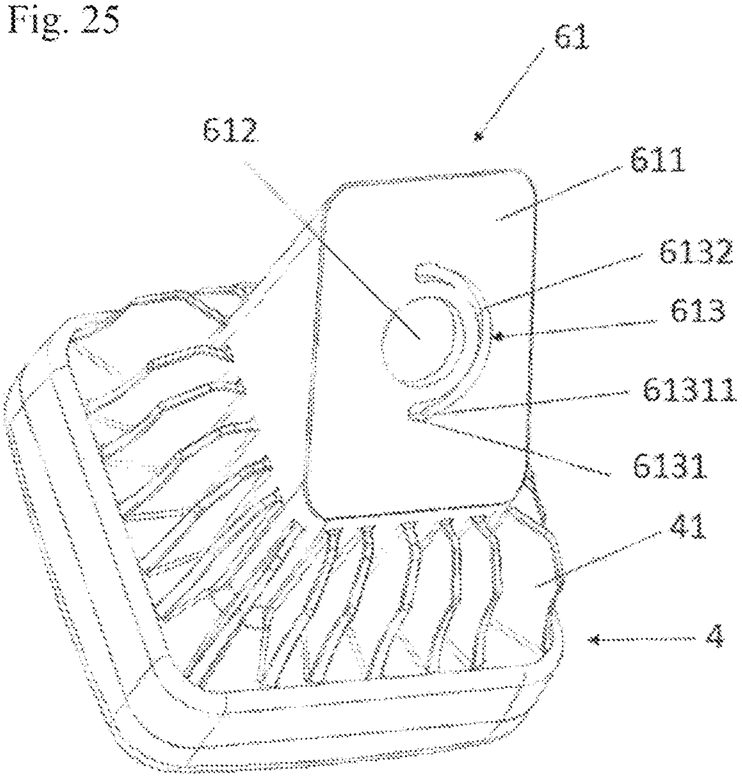
FIG. 25 is a structurally schematic view of the first rotating member and the heat sink of an exemplary embodiment of the LED lamp of the invention.

As shown in FIGS. 16-18, the LED lamp may include a stretching portion 7 which may be disposed between the case 1 and the lamp head 5. The LED lamp can be stretched by the stretch of the stretching portion 7 to elongate the overall length of the LED lamp. The stretching portion 7 may include a first stretching member 71 between the lamp head 5 and the case 1. The first stretching member 71 has a specific length in the length direction of the LED lamp. During the use of the LED lamp, when stretching the stretching portion 7 of the LED lamp, the first stretching member 71 is stretched (extended) toward a direction which is opposite to the light source (or opposite to the light emitting direction) to elongate the length of the LED lamp (the second status). In the embodiment, when the stretching portion 7 is not stretched yet (the first status), a part of the first stretching member 71 is located in the case 1. Furthermore, a part of the first stretching member 71 may be located in the lamp head 5. While the stretching portion 7 is being stretched, the first stretching member 71 is pulled out of the case 1 to be exposed from the case 1. In another embodiment, the first stretching member 71 may be partially located outside the case 1. While the stretching portion 7 is being stretched, the first stretching member 71 is moved toward a direction which is opposite to the light source (or opposite to the light emitting direction), and the case 1 which is partially covered by the first stretching member 71 is exposed.

The first stretching member 71 may include a cylinder portion 714 and a blocker portion 715. The blocker portion 715 is disposed at an end of the first stretching member 71, which is adjacent to the light source. The cylinder portion 714 is disposed at an end of the first stretching member 71, which is far away from the light source with respect to the blocker portion 715. The perimeter of the outer periphery of the blocker portion 715 is greater than the perimeter of the outer periphery of the cylinder portion 714. The blocking action of the blocker portion 715 can effectively prevent the first stretching member 71 from excessively stretching from the case 1 (completely detaching from the case 1) and thus falling off.

As shown in FIGS. 14-22, the stretching portion 7 may further include a second stretching member 72 between the case 1 and the lamp head 5. The second stretching member 72 is fixed and connected to the case 1. Further, the second stretching member 72 may be disposed around the first stretching member 71. The first stretching member 71 may include a receiving trough 712. The second stretching member 72 may include a sliding arm 721. At least a part of the sliding arm 721 is movably received in the receiving trough 712 so as to make the stretching portion 7 of the LED lamp perform a stretching action. The second stretching member 72 may include a second case connecting portion 722, which is connected and fixed to the case 1. In detail, the second case connecting portion 722 may include a first fixing member 7221, and the case 1 may include a second fixing member 11. The first fixing member 7221 is connected to and matched with the second fixing member 11. The first fixing member 7221 may be one or more protrusions, and the second fixing member 11 may be an opening corresponding to the first fixing member 7221. The first fixing member 7221 is embedded into the second fixing member 11 so as to connect and fix the case 1 with the second stretching member 72. The second case connecting portion 722 may further include a third fixing member 7222 which is disposed around an end of the case 1 and abuts against an outer edge of the end of the case 1 so as to further implement the fixing and connection between the second stretching member 72 and the case 1. The perimeter of the inner periphery of the third fixing member 7222 is great than or equal to the perimeter of the outer periphery of the cylinder portion 714 of the first stretching member 71 so as to make the cylinder portion 714 of the first stretching member 71 relatively movable in the second stretching member 72. The perimeter of the inner periphery of the third fixing member 7222 is small than or equal to the perimeter of the outer periphery of the blocker portion 715 of the first stretching member 71 so as to prevent the first stretching member 71 from excessively being over-pulled out.

As shown in FIGS. 14-20, the first stretching member 71 may include a third limiting member 713, and the sliding arm 721 of the second stretching member 72 may include a second limiting member 7211. The third limiting member 713 cooperates with the second limiting member 7211 to limit the stretch of the stretching portion 7 to avoid improperly over-stretching. In detail, the third limiting member 713 may be an open round hole located at a distal end of the receiving trough 712 of the first stretching member 71. The second limiting member 7211 may be a pillar toward the axial direction of the LED lamp. The second limiting member 7211 may be located on the sliding arm 721 of the second stretching member 72. Further, the second limiting member 7211 may be located at an end of the sliding arm 721 of the second stretching member 72, which is adjacent to the light source 2. When pushing the first stretching member 71 into the case 1 and reaching the maximum entry value, the second limiting member 7211 is embedded into the third limiting member 713 to make the first stretching member 71 be not excessively pushed into the case 1. Each of two sides of the third limiting member 713 may be disposed with an open trough to increase the elastic deformability of the third limiting member 713, so that while the first stretching member 71 is being drawn and exerted with a proper force, the second limiting member 7211 can be pulled out to stretch the LED lamp.

An end of the sliding arm 721 of the second stretching member 72, which is adjacent to the light source 2, may be in contact with the power board 81 so as to fix and limit the power board 81. An end of the sliding arm 721 of the second stretching member 72, which is adjacent to the light source 2, may also be out of contact with the power board 81 and be adjacent to the power board 81 so as to prevent the power board 81 from over-moving. To a certain extent, it plays a role of limiting the power board 81.

As shown in FIGS. 14-23, a side of the first stretching member 71, which is toward the lamp head 5, may include a first case connecting portion 711. The first case connecting portion 711 cooperates and connects with the lamp head rotating portion 51 of the lamp head 5 to make the case 1 and the lamp head 5 rotate relatively. The lamp head rotating portion 51 may be connected and fixed to the first case connecting portion 711 by engagement or fastening. The lamp head rotating portion 51 includes a first rotating unit 511. The first case connecting portion 711 includes a second rotating unit 7111. The first rotating unit 511 cooperates with the second rotating unit 7111 to make the lamp head 5 and the case 1 rotate relatively. In the embodiment, the first rotating unit 511 may be an inverted hook, and the second rotating unit 7111 may be a bump of the case connecting portion 711 protruding toward a direction which is far away from the axial direction of the LED lamp. The first rotating unit 511 abuts against the second rotating unit 7111. When rotating, the second rotating unit 7111 is matched and connected by the first rotating unit 511 to make the second rotating unit 7111 rotate on a side of the first rotating unit 511, which is far away from the case 1. In other embodiments, the second rotating unit 7111 may be an inverted hook, and the first rotating unit 511 may be a bump of the case rotating portion 51 protruding toward a direction which is far away from the axial direction of the LED lamp. The first rotating unit 511 abuts against the second rotating unit 7111. When rotating, the second rotating unit 7111 is matched and connected by the first rotating unit 511 to make the second rotating unit 7111 rotate on a side of the first rotating unit 511, which is far away from the case 1 (that is, regardless of the actual structures of the first rotating unit 511 and the second rotating unit 7111, the action of the matching and connection between the both is that the second rotating unit 7111 rotates on a side of the first rotating unit 511, which is far away from the case 1, so as to make the case fixing portion 52 be always inside the lamp head rotating portion 51 without separating to the outside of the lamp head rotating portion 51 while the lamp head rotating portion 51 is rotating.). The first rotating unit 511 and the second rotating unit 7111 may adopt other matching manners to make the case 1 and the lamp head 5 implement a stable rotation without making the lamp head 5 fall off.

The first case connecting portion 711 may include a lamp head rotating limiting portion 7112. By the limiting of the lamp head rotating limiting portion 7112 of the lamp head 5, when the lamp head 5 rotates relative to the case 1, it will form an action of limiting to prevent the lamp head 5 from over-rotating. In detail, the lamp head rotating limiting portion 7112 may be located on the second rotating unit 7111 so as to make the lamp head rotating limiting portion 7112 be integrated with the second rotating unit 7111 for structural simplification. The lamp head rotating limiting portion 7112 may also be located at positions other than the second rotating unit 7111, that is, the lamp head rotating limiting portion 7112 is not integrated with the second rotating unit 7111 so as to avoid installing or rotating difficulty due to large interference or falling off from the lamp head due to small interference. The lamp head rotating portion 51 may include a limiting matching portion 512, which cooperates with the lamp head rotating limiting portion 712 to accomplish the limiting effect.

In more detail, the lamp head rotating limiting portion 7112 may be a bump of the first stretching member 71, which protrudes toward a direction which is far away from the axial direction of the LED lamp, and the limiting matching portion 512 may be a stopper disposed inside the lamp head rotating portion 51. When rotating, the lamp head rotating portion 51 rotates relative to the first case connecting portion 711 and the limiting matching portion 512 rotates relative to the lamp head rotating limiting portion 7112 so as to make the limiting matching portion 512 stop rotating when it touches the lamp head rotating limiting portion 7112 to achieve the limiting effect. In the embodiment, the first case connecting portion 711 is disposed with a first lamp head rotating limiting portion 7113 and a second lamp head rotating limiting portion 7114, which are arranged opposite to each other (preferably, the angle difference therebetween is 180°), the lamp head rotating portion 51 is disposed with a first limiting matching portion 5121 and a second limiting matching portion 5122, which are arranged opposite to each other (preferably, the angle difference therebetween is 180°). The first limiting matching portion 5121 is located on a side between the first lamp head rotating limiting portion 7113 and the second lamp head rotating limiting portion 7114, and the second limiting matching portion 5122 is located on the other side between the first lamp head rotating limiting portion 7113 and the second lamp head rotating limiting portion 7114 so as to make the first limiting matching portion 5121 abuts against the first lamp head rotating limiting portion 7113 and the second limiting matching portion 5122 abuts against the second lamp head rotating limiting portion 7114 to be finally limited without over-rotation when rotating to a limited position in one direction. On the other hands, the first limiting matching portion 5121 abuts against the second lamp head rotating limiting portion 7114 and the second limiting matching portion 5122 abuts against the first lamp head rotating limiting portion 7113 to be finally limited without over-rotation when rotating to a limited position in an opposite direction. In another embodiment, the lamp head rotating limiting portion 7112 and the limiting matching portion 512 may also adopt other matching manners to make the case 1 and the lamp head 5 implement a relatively stable rotation without over-rotation.

The realization of the LED lamp of the present invention in each embodiment is as described above. It should be reminded that, in each embodiment, for the same LED lamp, the features of "the first rotating member is arranged facing to the second rotating member", "the first rotating surface is arranged facing to the second rotating surface", "the first rotating surface is the same or substantially the same as the second rotating surface", "the second rotating portion may be inserted into the first rotating portion", "the second rotating portion may be an extended portion towards the first rotating portion", "the first rotating portion may be an opening", "the first rotating member may include a first limiting member", "the second rotating member may include a second limiting member", "the first limiting member may be a stopper", "the second limiting member may be a bump toward the first rotating member", "the first limiting member may be a recess", "the second limiting member may be a bump toward the first rotating member", "The cover is connected and fixed to the heat sink", "the cover may include a curved surface", "the cover may include a side portion that is light-permeable", "the first rotating member of the rotating structure may be located on the heat sink", "the second rotating member of the rotating structure may be located on the case", "the heat sink may include a lamp board fixing portion for fixing the lamp board", "the heat sink may be made of metal", "the lamp board may be fixed on the lamp board fixing portion of the heat sink by glue, screw fastening, rivet welding and other methods", "the case may include a chamber" and "the power source may be received in the chamber of the case" can only be applied individually or integrally in practice, so that only one feature is implemented or several features are implemented simultaneously.

For example, the case may include a chamber, and the power source may be received in the chamber of the case.

For example, the second rotating portion may be an extended portion toward the first rotating portion, and the first rotating portion may be an opening.

In other words, the aforementioned features may be arbitrarily arranged and combined for the improvement of the LED lamp.

It should be understood that the foregoing description is for the purpose of figure description instead of limitation. Many implementations and many applications other than the examples provided will be apparent to those people skilled in the art by reading the above description. The scope of the present teachings, therefore, should be determined not with reference to the above description, but should be determined with reference to the appended claims, along with the full scope of equivalents to which such claims are entitled. The disclosures of all articles and references, including patent applications and publications, are hereby incorporated by reference for completeness. The omission in the claims of the subject matters disclosed therein is not intended to be a disclaimer of such subject matters, nor should it be considered that the inventors did not consider the subject matters to be part of the disclosed inventive subject matters.

What is claimed is:

1. A light-emitting diode (LED) lamp, comprising:

a case;

a power source, disposed in the case;

a heat sink, connected with the case, and disposed at an end of the case;

a light source, disposed on the heat sink, and electrically connected to the power source;

a lamp head, connected with the case; and a rotating structure, disposed at a junction between the case and the heat sink, the rotating structure comprising a first rotating member and a second rotating member, wherein the first rotating member is arranged facing to the second rotating member, the first rotating member comprises a first rotating face, the second rotating member comprises a second rotating face, the first rotating face is arranged facing to the second rotating face, there is an acute included angle a between the first rotating face and a sidewall of the case, there is an acute included angle b between the second rotating face and the sidewall of the case, wherein, $15° \leq a \leq 75°$, and $15° \leq b \leq 75°$.

2. The LED lamp of claim 1, wherein the first rotating member of the rotating structure is disposed on the heat sink, and the second rotating member of the rotating structure is disposed on the case.

3. The LED lamp of claim 2, wherein the first rotating member comprises a first rotating portion, the second rotating member comprises a second rotating portion, and the first rotating portion is connected with the second connecting portion.

4. The LED lamp of claim 3, wherein the second rotating portion is at least partially located in the first rotating portion.

5. The LED lamp of claim 3, wherein the first rotating member comprises a first limiting member, the second rotating member comprises a second limiting member, and the first limiting member is in contact with the second limiting member.

6. The LED lamp of claim 5, wherein the second limiting member is at least partially located in the first limiting member.

7. The LED lamp of claim 5, wherein the first limiting member comprises a recess, and the second limiting member comprises a protrusion.

8. The LED lamp of claim 5, wherein the first limiting member comprises a stopper and a recess, and the second limiting member comprises a protrusion.

9. The LED lamp of claim 1, wherein the light source comprises a lamp board, the lamp board comprises a first lighting unit and a second lighting unit, and the first lighting unit and the second lighting unit emit light with different color temperatures.

10. The LED lamp of claim 1, further comprising a stretching portion disposed between the case and the lamp head.

11. The LED lamp of claim 10, wherein the stretching portion comprises a first stretching member located between the lamp head and the case.

12. The LED lamp of claim 11, wherein the stretching portion comprises a second stretching member fixed and connected to the case.

13. The LED lamp of claim 12, wherein the second stretching member is disposed around the first stretching member.

14. The LED lamp of claim 13, wherein the first stretching member comprises a receiving trough, the second stretching member comprises a sliding arm, the sliding arm is at least partially and movably received in the receiving trough.

15. The LED lamp of claim 12, wherein the second stretching member comprises a second case connecting portion connected and fixed to the case.

16. The LED lamp of claim 15, wherein the second case connecting portion comprises a third fixing member disposed around an end of the case and abutting against an outer edge of the end of the case.

17. The LED lamp of claim 16, wherein the first stretching member comprises a cylinder portion and a blocker portion, the blocker portion is disposed at an end of the first stretching member proximal to the light source, the cylinder portion is disposed at an end of the first stretching member distal to the light source with respect to the blocker portion.

18. The LED lamp of claim 17, wherein a perimeter of an outer periphery of the blocker portion is greater than a perimeter of an outer periphery of the cylinder portion.

19. The LED lamp of claim 18, wherein a perimeter of an inner periphery of the third fixing member is great than or equal to the perimeter of the outer periphery of the cylinder portion.

20. The LED lamp of claim 18, wherein a perimeter of an inner periphery of the third fixing member is small than or equal to the perimeter of the outer periphery of the blocker portion of the first stretching member.

* * * * *